(12) United States Patent
Taguchi

(10) Patent No.: US 7,177,921 B2
(45) Date of Patent: Feb. 13, 2007

(54) METHOD AND APPARATUS FOR STORAGE NETWORK MANAGEMENT

(75) Inventor: Yuichi Taguchi, San Jose, CA (US)

(73) Assignee: Hitachi, Ltd., Tokyo (JP)

( * ) Notice: Subject to any disclaimer, the term of this patent is extended or adjusted under 35 U.S.C. 154(b) by 226 days.

(21) Appl. No.: 10/803,024

(22) Filed: Mar. 18, 2004

(65) Prior Publication Data

US 2005/0210137 A1    Sep. 22, 2005

(51) Int. Cl.
*G06F 15/177*   (2006.01)
*H04I 12/28*   (2006.01)

(52) U.S. Cl. .................................. 709/220; 370/389
(58) Field of Classification Search ................ 709/220
See application file for complete search history.

(56) References Cited

U.S. PATENT DOCUMENTS

| | | | |
|---|---|---|---|
| 5,881,050 A * | 3/1999 | Chevalier et al. ........... 370/230 |
| 6,434,624 B1 | 8/2002 | Gai et al. |
| 6,665,273 B1* | 12/2003 | Goguen et al. ............. 370/252 |
| 6,684,209 B1* | 1/2004 | Ito et al. ........................ 707/9 |
| 6,735,190 B1* | 5/2004 | Chuah et al. ................ 370/352 |
| 6,775,280 B1* | 8/2004 | Ma et al. .................... 370/392 |
| 6,779,083 B2 | 8/2004 | Ito et al. |
| 6,839,746 B1 | 1/2005 | Muthiyan et al. |
| 6,856,991 B1* | 2/2005 | Srivastava ................... 707/10 |
| 6,865,617 B2 | 3/2005 | Zeidner et al. |
| 6,885,677 B1* | 4/2005 | Klevans ....................... 370/466 |
| 2001/0019554 A1 | 9/2001 | Nomura et al. |
| 2001/0026553 A1 | 10/2001 | Gallant et al. |
| 2002/0003891 A1 | 1/2002 | Hoshino |
| 2002/0038391 A1 | 3/2002 | Ido et al. |
| 2002/0071389 A1* | 6/2002 | Seo ............................. 370/232 |
| 2002/0143999 A1 | 10/2002 | Yamagami |
| 2003/0005119 A1 | 1/2003 | Mercier et al. |
| 2004/0167972 A1 | 8/2004 | Demmon |
| 2006/0013222 A1* | 1/2006 | Rangan et al. .............. 370/389 |
| 2006/0036719 A1* | 2/2006 | Bodin et al. ................. 709/223 |

FOREIGN PATENT DOCUMENTS

EP    1 091 526 A2    3/2000

(Continued)

OTHER PUBLICATIONS

Sheldon, Linktionary, "MPLS (Multiprotocol Label Switching)", Aug. 11, 2003, "http://web.archive.org/web/20030801193729/http://www.linktionary.com/m/mpls.html".*

(Continued)

*Primary Examiner*—David Wiley
*Assistant Examiner*—J. Bret Dennison
(74) *Attorney, Agent, or Firm*—Reed Smith LLP; Stanley P. Fisher, Esq.; Juan Carlos A. Marquez, Esq.

(57) ABSTRACT

A managed network storage apparatus comprising a plurality of storage service management devices, a storage device, a multi protocol label switching network and a plurality of client groups performs a label distribution method that insures that clients and service providers are provided with network Quality of Service, storage performance, and network security. A network management device calculates alternative best routes for the data in order to satisfy the Quality of Service parameters and the storage performance requirements.

10 Claims, 17 Drawing Sheets

FOREIGN PATENT DOCUMENTS

| | | |
|---|---|---|
| EP | 1 143 681 A2 | 6/2000 |
| EP | 1 244 265 A2 | 11/2001 |

OTHER PUBLICATIONS

Awduche et al., "RFC 2702—Requirements for Traffic Engineering Over MPLS", Sep. 1999.*

Rosen et al., "RFC 3031—Multiprotocol Label Switching Architecture", Jan. 2001.*

Yoshida, "LUN Security Considerations for Storage Area Networks," 1999, Hitachi Data Systems, pp. 1-7.

"An Introduction to MPLS," http://www.convergedigest.com/Bandwidth/archive/010910TUTORIAL-rgallaher1.htm, Sep. 10, 2001, 15 pages.

Multiprotocol Label Switching (MPLS) Traffic Engineering, Cisco IOS Release 12.0(5)S, pp. 1-80.

"Advanced Topics in MPLS-TE Deployment," Cisco Systems, Inc. 1992-2002, pp. 1-33.

Durham et al., The COPS (Common Open Policy Service) Protocol, Network Working Group, Standards Track, Jan. 2000, http://www.ietf.org/rfc2748.txt, pp. 1-41.

"HP OpenView Network Node Manager," Hewlett-Packard Company, Version 6.4, Jan. 2003, pp. 1-707.

Clark, "IP SANs: A Guide to iSCSI, iFCP, and FCIP Protocols For Storage Area Networks," Nov. 2001, pp. 139-141, 170-172, 185-189.

"Hitachi Freedom Storage™, Software Solutions Guide," Hitachi Data Systems, pp. iv-x, 1-75.

* cited by examiner

| Link ID | Object ID | Port ID | Object ID | Port ID |
|---------|-----------|---------|-----------|---------|
| 0001 | #6 | 1 | #0 | 1 |
| 0002 | #6 | 2 | #0 | 2 |
| 0003 | #0 | 3 | #1 | 1 |
| 0004 | #0 | 4 | #2 | 1 |
| 0005 | #1 | 2 | #3 | 1 |
| 0006 | #2 | 2 | #3 | 2 |
| 0007 | #2 | 3 | #4 | 1 |
| 0008 | #3 | 3 | #4 | 2 |

FIG. 8

| LSP ID | LSR ID | Link ID | Label | Quality |
|---|---|---|---|---|
| A01 | #6 | 0001 | 22 | 1Gb |
|  | #0 | 0004 | 6 | 1Gb |
|  | #2 | 0007 | 19 | 1Gb |
|  | #4 | N/A | N/A | N/A |
| A02 | #6 | 0002 | 3 | 500Mb |
|  | #0 | 0003 | 8 | 500Mb |
|  | #1 | 0005 | 43 | 500Mb |
|  | #3 | N/A | N/A | N/A |

FIG. 9

METHOD AND APPARATUS FOR STORAGE NETWORK MANAGEMENT

BACKGROUND OF THE INVENTION

1. Field of the Invention

The invention is related to a network management method and apparatus directed to providing security and performance guaranteed service to clients and service providers of storage networks.

2. Related Art

Storage area networks, also called SANs, use Fibre Channel (FC) network platform technology. According to a presently widespread technology, SANs are used to maximize network performance by offloading storage from the server to a dedicated storage device accessed and accessible by the server. These devices (that can be RAID arrays, JBODs, tape drives) are located on the network.

SANs are wide-ranging and very diverse. Depending on need, a SAN can range from a simple server-to-storage device connection, to a labyrinth of servers, hubs, switches, and storage devices in either a loop (hub) or across a fabric (switch). For example, the point-to-point "starter" SAN is a preferred choice for a home office, small office, or department. One of the greatest benefits a SAN offers is scalability. Unlike a small computer system interface (SCSI) connection, which only allows for the attachment of 15 nodes per bus, a SAN offers up to 16 million devices attached and running on a single network. For the currently running Fibre Channel SANs, upgrading is easy, and virtually limitless.

Storage input/output requires high-speed data transfer, especially for the business application services. Fibre channel network platforms have provided that so far. But the appearance of applications such as Internet Protocol storage (IP), and more specifically of Internet Small Computer System Interface Protocol (iSCSI), or Internet Fibre Channel Protocol (iFCP), posses new challenges for SANs. IP SANs provide access from distances that prior were not available without compromising the Quality of Service parameters.

The present invention is directed to methods and systems that aim to consistently provide network Quality of Service and storage performance for clients and service providers alike.

SUMMARY OF THE INVENTION

By employing the means and methods of the present invention network clients are able to access their storage via a Quality of Service guaranteed network path. At the same time, service providers can manage their Quality of Service more effectively. Service providers are able to manage clients by groups, such as IP subnets, very large area networks (VLANs) and others. Further, service providers can set up an end-to-end path between clients and storage devices while maintaining the consistency of Quality of Service and security.

The present invention can be implemented with a managed network storage apparatus that allows service providers to attain network Quality of Service (QoS) and storage performance. The managed network storage apparatus comprises a plurality of storage service management servers, a storage device, a multi protocol label switching network (MPLS) operatively connected to the storage device, and a plurality of client groups functionally connected to the MPLS network. The plurality of storage service management servers is operatively connected to the storage device. The plurality of storage service management servers and the storage device are operatively connected by a storage device. The storage device and the MPLS network are operatively connected by a plurality of network paths. The MPLS network and the plurality of client groups are functionally connected by a plurality of network paths.

The invention can also be implemented using a storage network with network management service. In this embodiment the network comprises a plurality of storage service management servers, a storage device, a multi protocol label switching (MPLS) network operatively connected to the storage device, a plurality of client groups functionally connected to the MPLS network, and a network management server simultaneously operationally connected to the plurality of storage service management servers and functionally connected with the storage device and to at least one of the plurality of client groups. The plurality of storage service management servers is operatively connected with the storage device. The plurality of storage service management servers and the storage device are operatively connected by a network path. The storage device and the MPLS network are operatively connected by a plurality of network paths. The MPLS network and the plurality of client groups are functionally connected by a plurality of network paths. The network management server is operationally connected with the plurality of storage service management devices by means of storage network management communication path. The network management server is functionally connected with the storage device by a network path.

In a storage system having a plurality of ports and a plurality of logical devices, wherein the ports are connected via a MPLS network and the ports conduct MPLS protocol, a method for establishing a path between at least one logical device and a client connected to the MPLS network according to the invention comprises selecting a port of the ports; establishing, at the port, a label switching path (LSP) to the client with requesting bandwidth; setting priority or bandwidth of the port; and attaching the at least one logical device to the port.

In a storage system having a plurality of ports and a plurality of logical devices, wherein the ports are connected via a MPLS network and the ports conduct MPLS protocol, a method for establishing a path between at least one logical device and a client connected to the MPLS network according to the invention comprises selecting a port of the ports; requesting from the port to a management server connected to the MPLS network, establishment of a label switching path to the port with requesting bandwidth; establishing at the port a LSP to the client with requesting bandwidth; setting priority or bandwidth of the port; and attaching the at least one logical device to the port.

A storage system of the invention comprises a plurality of ports coupled to a MPLS network, the ports with capability of establishing a LSP to a client coupled to the MPLS network; and a plurality of logical devices to be attached to at least one of the plurality of ports.

Establishing a label switching table involves issuing network path information with quality parameters, sending at least one path setup request to at least one of a plurality of label switch routers, distributing at least a label generated by the at least one of a plurality of label switch routers, and establishing the label switching table. The network path information is issued by at least one of a plurality of storage service management devices to a penultimate label switch router of a plurality of label switch routers.

Retrieving data comprises receiving data from at least one of a plurality of client groups, transferring the data via at least one of a plurality of label switching tables each pertaining to a plurality of label switch routers, writing the data into a storage device, generating a signal that indicates successful receipt of data by said storage device, and transferring the signal to at least one of the plurality of client groups.

Transferring retrieved data to at least one of a plurality of clients, and releasing a label switching table entails sending a label switching table release request to an ultimate label switch router, transferring the request to at least one of a plurality of label switch routers, and releasing the retrieved data from a label switching table. The transfer occurs in reverse from the ultimate label switch router, in a single-step transfer between successive label switch routers.

The method of using the managed network storage apparatus with network management service further comprises the steps of sending a request from a storage management device to a network service management device, calculating a network route to satisfy the QoS parameters, sending a path setup request to a storage device, sending a path setup request to at least one of a plurality of label switch routers, establishing a label switching table, and updating status information for a virtual private network based on said label switching table. The request consists of identifying a network route based on the QoS parameters. The path setup request originates from the network service management device.

BRIEF DESCRIPTION OF THE DRAWINGS/FIGURES

The present invention will be described hereinbelow with reference to the accompanying drawings.

FIG. 8 illustrates an example of data structure for the topology map of the network service management element.

FIG. 9 illustrates status information for the virtual private network of the network service management element.

DETAILED DESCRIPTION OF THE INVENTION

The present invention is directed to storage devices and, more particularly, to storage devices that have label switching capability on a network interface.

The present invention is also directed to networked storage devices and, more particularly, to storage devices that do not possess label switching capability. In this aspect of the invention, a port bandwidth controller insures the network QoS consistency, between networked label switching ports and the storage port.

The present invention is directed to networked storage systems and, more particularly to storage systems that have the capability of establishing a label switching path between the network client groups and the storage system.

The present invention is directed to networked storage devices and, more particularly, to storage devices that are managed by a management server. The label switching path established between the network client groups and the storage system is both network quality and network security guaranteed, as defined by the storage service management server.

The present invention is described herein in relation to storage area networks (SAN) that are accessed by clients or by service providers interested in receiving, providing and maintaining QoS, security of service and storage performance. The present invention is not, however, limited to use within SANs. Based on the description herein, one skilled in the relevant art(s) will understand that the invention can be implemented in other environments as well. Such implementations are within the spirit and scope of the invention as disclosed and claimed.

The apparatus that constitutes the object of the present invention and its various embodiments allows service providers to practice a method that permits them to provide consistent guaranteed QoS storage services, which constitutes another object of the present invention.

Among other benefits that arise from practicing the present invention, clients or client group can access their storage volume via a QoS guaranteed network path; service providers can manage their clients by groups, such as Internet Protocol subnets, Very Large Array Network (VLAN) groups, etc.; service providers can set-up an end-to-end path between clients and logical storage devices and concurrently maintain the QoS parameters and security of service requirements; and the MPLS based network can transfer data for distances that are beyond the physical limitations imposed by the fibre channel networks.

EXAMPLE APPARATUS EMBODIMENTS

Figure 1A:
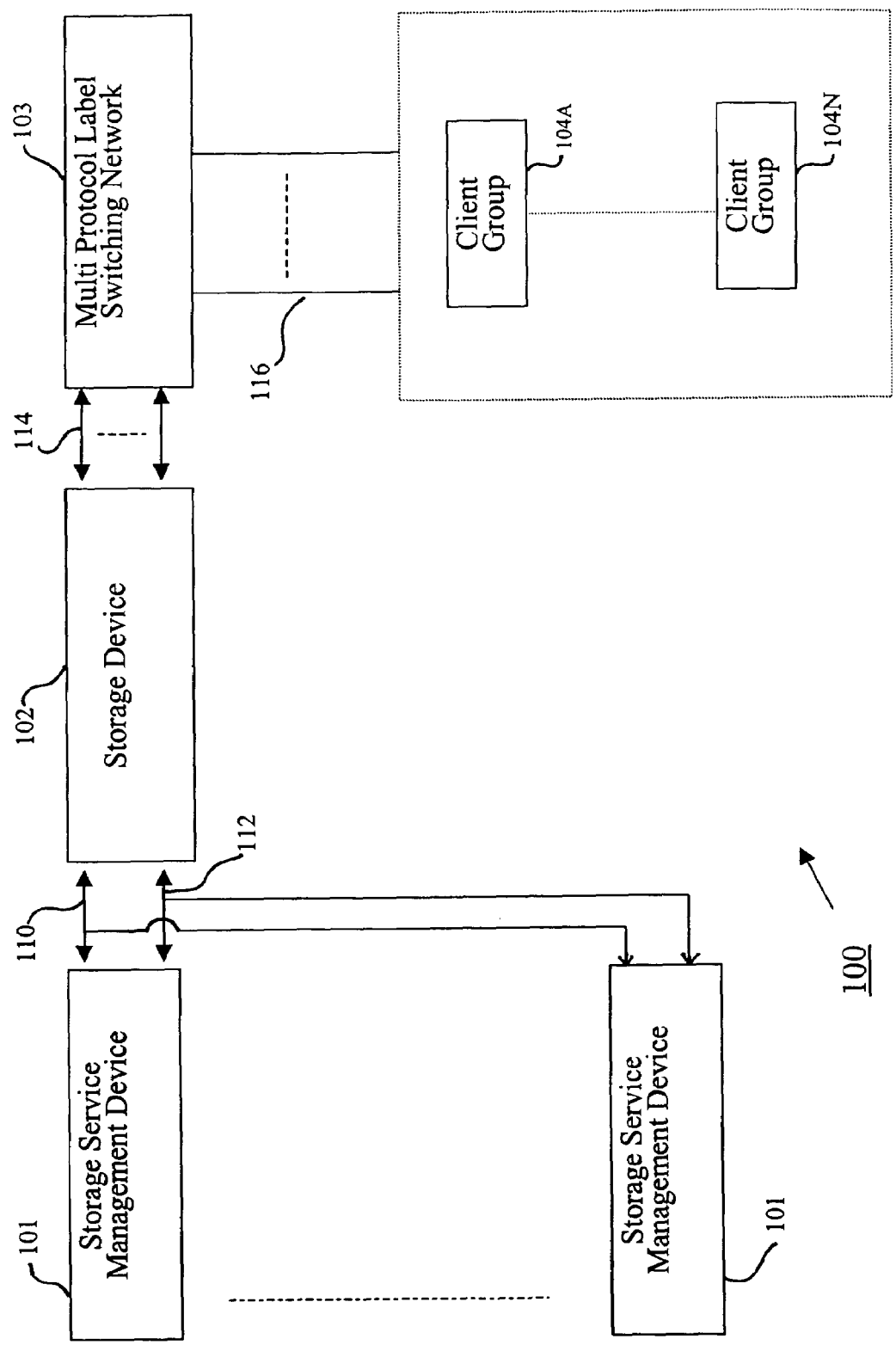
FIG. 1A is a high-level block diagram of a managed network storage apparatus, in accordance with the invention.

FIG. 1A is a high-level block diagram of a managed network storage apparatus, in accordance with the present invention. The managed network storage apparatus 100 can be implemented in hardware, software and/or a combination thereof.

The managed network storage apparatus 100 includes a plurality of storage service management devices 101, a storage device 102, a multi protocol label switching (MPLS) network 103, and a plurality of client groups 104. The plurality of storage service management devices 101 and the storage device 102 are operatively connected. They exchange data through a bi-directional data storage/logical device path 110 and a bi-directional data storage/MPLS Path Management path 112. The storage device 102 and the MPLS network 103 are operatively connected by at least one network path 114. The MPLS network 103 and the client group section 104 are functionally connected by a plurality of network output paths 116.

Figure 1B:
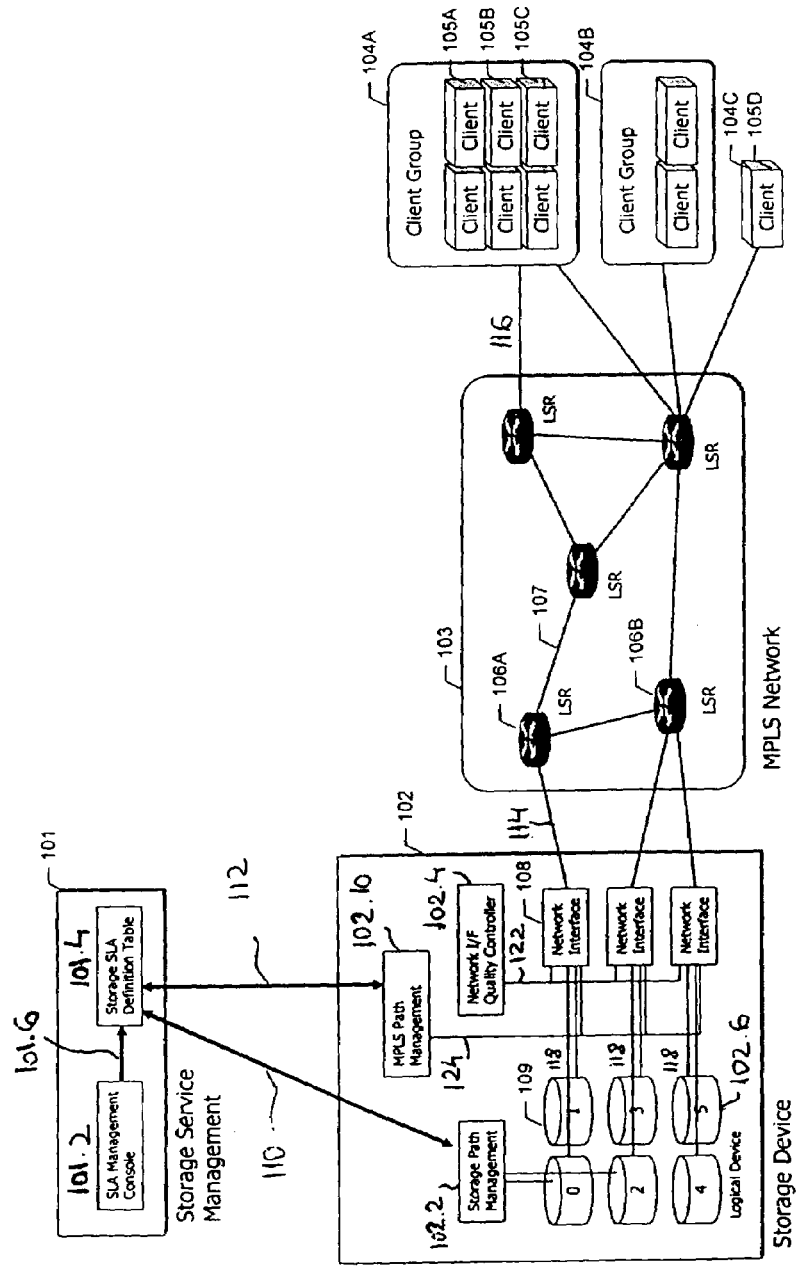
FIG. 1B illustrates the managed network storage apparatus of FIG. 1A, in accordance with an aspect of the present invention.

FIG. 1B illustrates an example implementation of the managed network storage apparatus of FIG. 1A, in accordance with one aspect of the present invention.

The plurality of storage service management devices 101 may be implemented using general purpose PC hardware or other data processing system as would be understood by one of skill in the art given this disclosure of the invention. An example of such PC hardware will be further described in connection with FIG. 12.

As shown in FIG. 1B, according to an embodiment of the present invention, each of the plurality of storage service management devices 101 comprises at least one Service Level Agreement (SLA) management console 101.2 and one storage SLA definition element for the SLA definition table 101.4. The SLA management console 101.2 and the storage SLA definition element for the SLA definition table 101.4 are operatively connected by a command/release path 101.6. A user interface program runs on the operating system installed on a general purpose PC or other similar device that constitutes the hardware implementation basis for the plurality of storage service management devices 101. The user interface program is the software implementation basis for the SLA management console 101.2. The storage for the SLA definition table 101.4 is a data depository. One of the functions of the SLA management console 101.2 is to maintain the data stored by the storage SLA definition table, and at the same time to operationally manage the data through the command/release path 101.6.

Figure 4:
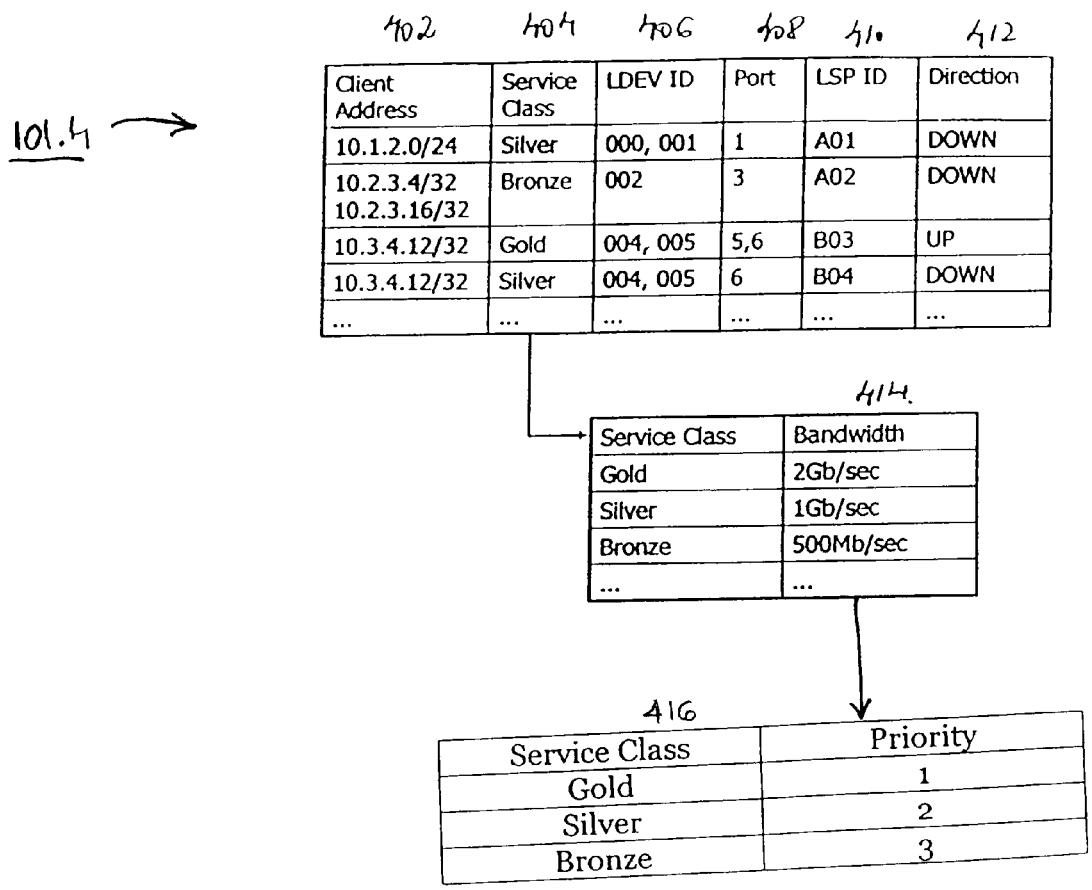
FIG. 4 illustrates an example of a data structure for the storage service level agreement definition table.

According to FIG. 4, the storage for the SLA definition table 101.4 stores the following data parameters: client's address 402, service class 404, disk storage resource (LDEV) ID 406, port number 408, label switching table ID (LSP ID) 410, and direction 412. The parameter service class 404 is defined depending on the parameter bandwidth 414. Further information about the above-mentioned parameters will be discussed hereinbelow and in connection with FIG. 4. An external agent, operator or device manually manages the LSP ID 410 and releases commands via SLA Management console 101.2.

The managed network storage apparatus 100 further includes a storage device 102. The storage device 102 of the managed network storage apparatus 100 is a disk storage array. An example implementation for the storage device 102 is a redundant array of independent disks (RAID) sub-system. Referring back to FIG. 1B, at least one storage service management device of the plurality of service management devices 101 is operatively connected to the storage device 102 by means of two bi-directional paths, a data storage/MPLS Path Management data path 112 and a storage/logical device data path 110. More precisely, the bi-directional data storage/logical device data path 110 opera- tively connects the storage for the SLA definition table 101.4 to an array of logical devices 102.6.

Each logical device of the array of logical devices 102.6 is provided, through an active data path 118, with access to the MPLS network 103 by means of an assigned network interface 108. In one embodiment of the present invention, each network interface 108 incorporates and maintains pre-determined volume mapping on the corresponding logical devices assigned to it. A storage path management element 102.2 of the storage device 102 stores and operates a storage path management program that is responsible for maintaining the predetermined volume mapping on each network interface 108. In the case of this example RAID subsystem implementation, a predetermined minimum number of logical devices or volumes must be available in order to be assigned to and activate a network interface 108.

Concurrently, the storage path management program stored by the storage path management element 102.2 controls a security function for the logical units (LUN) that address the data provided through the network 103 from the storage device 102. Currently, there are four approaches to providing LUN security: (i) host software, (ii) host bus adapter utilities, (iii) switch zoning, and (iv) mapping within a storage controller. All four of the above mentioned approaches are discussed in the paper: LUN Security Considerations for Storage Area Networks by Hu Yoshida, Hitachi Data Systems, (HYPERLINK http://www.hds.com), which is hereby incorporated herein by reference. The storage path management program allows volumes of data transmitted through the MPLS network to be masked from unauthorized access.

The MPLS Path Management element 102.10 is bi-directionally, operatively connected to the storage service management devices 101 for the SLA definition table 101.4. Element 102.10 stores a Network Path Quality Controller program. This program controls the parameters of a network path assigned to a network interface 108. Each of the plurality of network interfaces 108 is operatively connected to the MPLS Path Management element 102.10 through path 124. Among the controlled parameters are control bandwidth, route, etc. Each of the plurality of network interfaces 108 of storage device 102 is operatively connected with a network I/F Quality controller 102.4 through link 122.

Further, each of the network interfaces 108 of the storage device 102 is operatively connected with corresponding devices among the array of logical devices 102.6 through link 118, with the MPLS Path Management element 102.10 through link 124 and with the network I/F quality controller element 102.4 through link 122.

In one example embodiment of the invention, the network interface 108 is implemented with label switching and LSP management capabilities.

In another example embodiment of the invention, the network interface 108 is implemented with a port priority control function. For example, U.S. Patent Application Publication 2002/0003891 A1, published on Jan. 10, 2002, to Hoshino S., describes such an interface. For both embodiments mentioned above, the Network I/F Quality Controller program controls the network interface 108.

Again with reference to FIG. 1B, the storage system 102 is operatively connected to the MPLS network 103 by a connection network path 114. The MPLS network 103 consists of a plurality of label switch routers 106A, 106B, . . . , 106n that are interconnected by paths 107. The MPLS network 103, in one embodiment may be implemented using a technology that allows transferring data packets via label switching paths 107 that are assigned to special traffic.

The client groups 104 consist of a plurality of client groups 104A, 104B, 104C to 104n, and within each client group 104 are clients 105A, 105B, 105C to 105n. Specifically, each client group 104 consists of a set of clients 105 that can be subdivided, for purposes of better management, in subgroups. Examples of possible types of subgroups are: IP subnets, VLAN groups, groups selected according to the sites location, or groups selected according to a specific sets of logical parameters. In an example embodiment of this aspect of the invention and for illustrative purposes only, client group 104 is considered to be a single IP subnet. FIG. 4 which will be discussed hereinbelow further illustrates and defines the parameters that characterize, for this example implementation, the client 104. Under the same assumptions, client 105 is a client computer that issues an input/output request addressed to a storage array. The term of client computer is not intended to be used with any limitations. As one of skill in the art would understand, given this disclosure, a client 105 may be embodied in an iSCSI initiator or other similar devices/systems.

Figure 2:
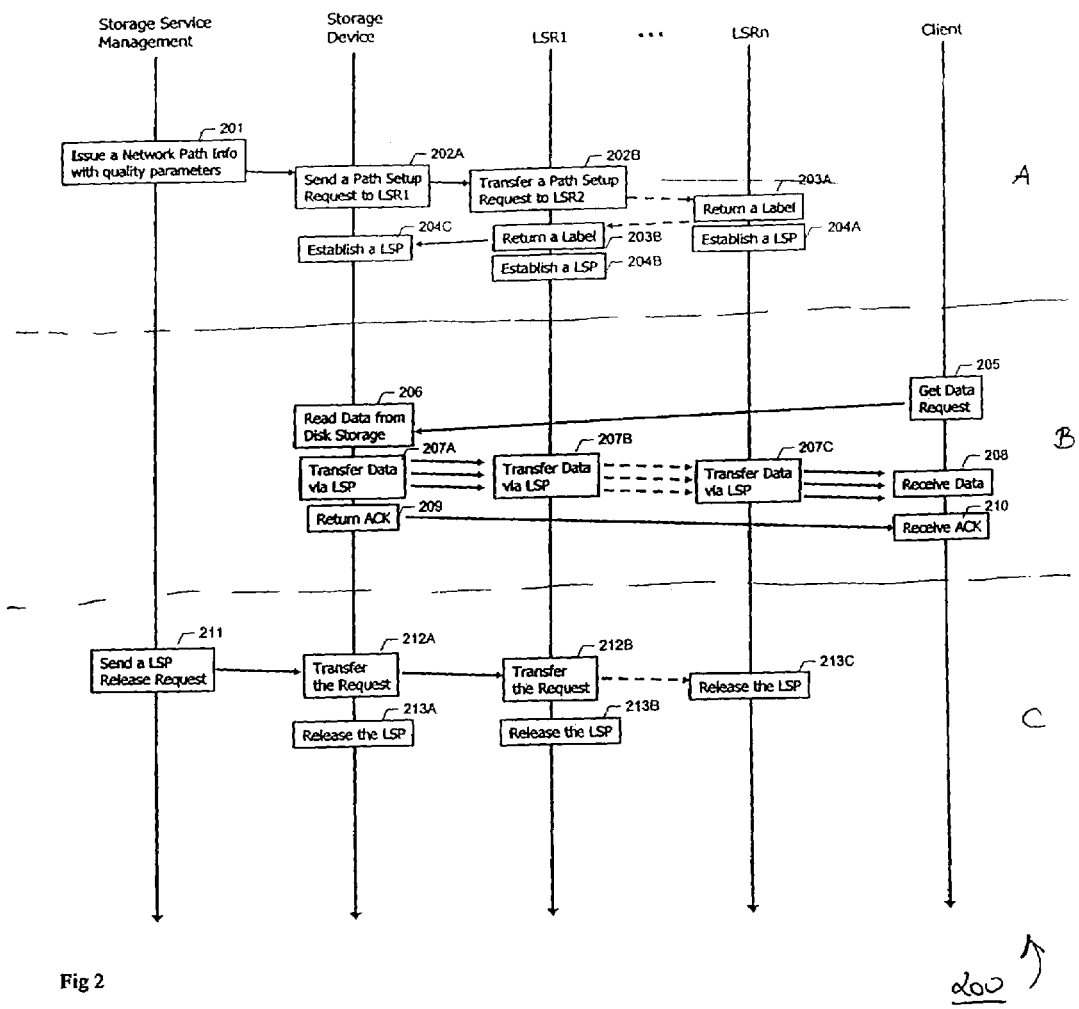
FIG. 2 illustrates an example method flowchart for using an apparatus for storage network management, in accordance with an aspect of the present invention.

As mentioned above, the managed storage network apparatus 100 is used for purposes of insuring QoS and security of service for clients and service providers. FIG. 2 illustrates an example method flowchart for using an apparatus for storage network management 100, in accordance with an aspect of the present invention.

Label distribution method 200 consists of three main sequences: sequence A, including steps 201 to 204, that establishes a label switching table; sequence B, including steps 205 to 210, that transfers the data from the storage device to the client; and sequence C, including steps 211 to 213, that releases the label switching table.

Sequence A of method 200 consists of steps 201, 202A, 202B, 203A, 203B, 204A, 204B and 204C. In operation, an external operator defines a new storage service request in the storage definition table 101.4. Subsequently, at least one of the plurality of storage service management devices 101 sends requests via paths 110 and 112 to both the storage path management block 102.2 and to the network path quality controller block 102.4. Storage service management device 101 issues network path information including the quality parameters (Step 201). The information is transmitted to the storage device 102, as described above. The storage device 102, more precisely the network path quality controller 102.4, sends a path setup request to a first label switch router via a network path 114 at Step 202 A. The path is set and its parameters defined from a network port to the client group with adaptive service regarding quality. The intrinsic parameters for the path are defined by the SLA definition table 101.4 and constitute part of the request made at Step 201. The path setup request is further transmitted to a subsequent label switch router, at Step 202B, via a label switching path 107. The path setup request is subsequently transmitted to $LSR_N$, at Step 202B. $LSR_n$ returns the label at Step 203A, and at the same time this label becomes a part of a label switching table that is being established with the contribution of each LSR. Each LSR returns a label to the storage device via network path 114. A label switching table (LSP) is formed at any of Steps 204A–204C.

Regarding the succession of steps of Sequence A, standard protocols are used to set the label switching table. Examples of such protocols are Label Distribution Protocol (LDP), Constrained Based Routing Using Label Distribution Protocol (CR-LDP) and Reservation Protocol Traffic Engineering (RSVP-TE).

Sequence A of method 200 is an example of a downstream-on-demand mode for the label distribution method. This implementation assumes that the LSP is static and is set at the external operator demand. However, in an alternative implementation, LSP may be dynamic, when new data is requested.

Sequence B of method 200 consists of Steps 205 to 210. At Step 205, the client or the client group, for example 104, issues a data request. In this implementation, the assumption that the client is an iSCSI initiator is still valid. Traditionally, iSCSIs use a SCSI protocol to transfer command messages over IP networks. Therefore, iSCSI clients customarily request block data transfers. The data request is transmitted to the storage device 102. At Step 206, data is read from a disk storage resource of the storage device 102, as requested. At the subsequent Step 207, the storage device 102 transfers the data from the network interface port that is connected to the LDEV, using the storage path 118. A label is pushed into the packet header to identify the label switching table. The label switching routers transfer the data via label switching tables. At the subsequent Step 208, data is received by the client. The client issues an acknowledgement of receipt at Step 210, that the data was successfully received; at Step 209, the acknowledgement is returned to the storage device 102.

Sequence C of method 200 consists of Steps 211 to 213. The storage service management device 101 sends a LSP release request at Step 211 to be transmitted subsequently through the storage device to the $LSR_n$. The request transfer constitutes Step 212. $LSR_{1-n}$, release the LSP at Steps 213A–213C as the request is transferred to each of them. As a result, the label switch table is released by the network.

The data transfer as described above has a guaranteed quality. The data is provided according to how it was defined by the label switch table. Therefore, the QoS parameters for the data provided through the managed network are guaranteed for the clients and for the service provides.

The Label Distribution in method 200 is performed with the contribution of each individual element of the managed storage network apparatus 100. The plurality of storage service management elements 101 performs Step 201 by issuing a network path information with quality parameters. Element 101 also performs Step 211 when sending a LSP release request to the storage device 102.

The storage device 102 performs a plurality of the steps of the method 200. A summary of the steps performed by the storage device 102 is provided below:

Step 202A when sending a path setup request to LSR1;
Step 204B when establishing a LSP;
Step 206 when reading data from disk storage;
Step 207A when transferring data via LSP;
Step 209 when returning a signal that data was received successfully;
Step 212A transferring the LSP release request; and
Step 213A when releasing the LSP.

The LSR designated number one ($LSR_1$) also performs a plurality of the method steps. A summary of the steps performed by the $LSR_1$ is as follows:

Step 202B when transferring a path setup request to a subsequent LSR;
Step 203B when returning a label;
Step 204B when establishing a LSP;
Step 207B when transferring data via a LSP;
Step 212B when transferring a LSP release request; and
Step 213B when releasing the request.

The LSR designated with the ultimo number ($LSR_n$) in the MPSL network 103 performs a plurality of method steps. A summary of steps performed by the $LSR_n$ is presented below:

Step 203A when returning a label;
Step 204A when establishing a LSP;
Step 207C when transferring data via LSP; and
Step 213C when releasing the LSP.

The plurality of client groups or clients 105A—105n also perform a plurality of steps. A summary of the steps performed by the clients or client groups are presented below:
Step 205 when getting the data request;
Step 208 when receiving data; and
Step 210 when receiving a confirmation signal that the data was successfully received.

Figure 3:
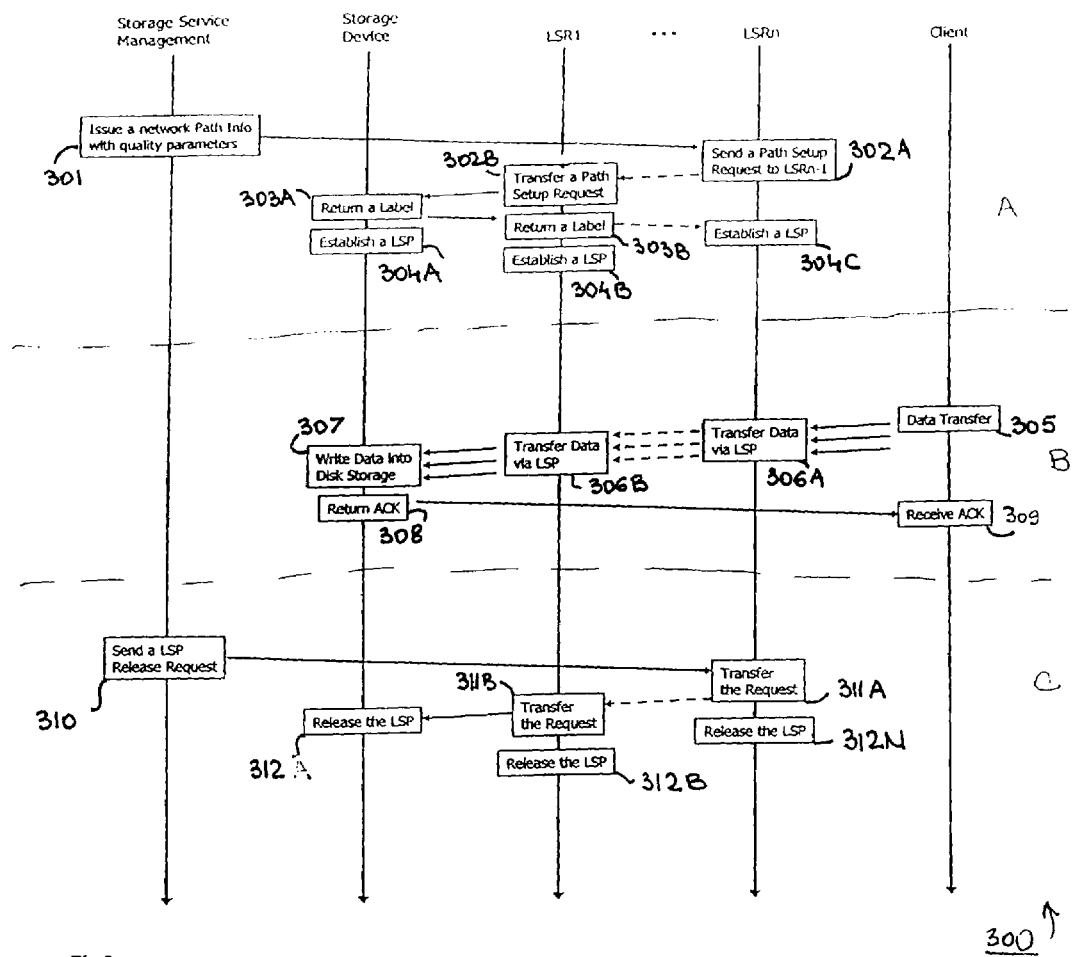
FIG. 3 illustrates another example method flowchart for using an apparatus for storage network management, in accordance with another aspect of the present invention.

The steps of the label distribution method 200 may be performed using the apparatus for storage network management 100, in different succession from the one illustrated in FIG. 2 and described above. FIG. 3 illustrates another example method flowchart for using a managed network storage apparatus, in accordance with another aspect of the present invention.

The distribution method 300 consists of three main sequences: sequence A, including Steps 301 to 304, that establishes a label switching table; sequence B, including steps 305 to 309, that transfers the data from the storage device to the client, and sequence C, including steps 310 to 312, that releases the label switching table. When performing the succession of steps 300 it is assumed that the information output path 116 is unidirectional. According to this hypothesis, an individual information output path must be established from the client 104 or 105, to the storage device 102, in order to realize the upstream data transfer.

Sequence A of method 300 consists of steps 301, 302A, 302B, 303A, 303B, 304A, 304B and 304C. An external operator defines a new storage service with parameters in the storage definition table 101.4. Subsequently, at least one of the plurality of storage service management devices 101 sends requests via paths 110 and 112 to both the storage path management block 102.2 and to the network path quality controller block 102.4. Storage service management device 101 issues network path information with quality parameters at Step 301. The storage device 102, more precisely the network path quality controller, sends a path setup request to an ultimate label switch router LSRn via a network path 114. The path is set and its parameters defined from a network port to the client group with adaptive service regarding quality. These intrinsic parameters of the path are defined by the SLA definition table 101.4 and constitute part of the request made at Step 301. The information is transmitted to the final or ultimate designated label switching router ($LSR_n$) at Step 302A by sending a path setup request to the penultimate designated LSR ($LSR_{n-1}$).

From the ultimate label switching router LSRn, the setup request in forwarded in a reversed single step transfer to the LSR1 at Step 302B. The storage device 102 ultimately receives the transfer of path setup request. The storage device 102 returns a label at Step 303A and establishes a LSP, at Step 304A. The label is returned by the storage device at Step 303A, and is received by the first designated LSR1 at Step 303B. LSR1 then establishes a LSP at Step 304B. The above sequence repeats or continues identically for each LSR of the MPLS network 103 until, in step 304C, the last designated LSRn establishes a LSP.

Regarding the succession of steps in sequence A of method 300, standard protocols are used to set the label switching table. Examples of such protocols are: Label Distribution Protocol (LDP), Constrained Based Routing Using Label Distribution Protocol (CR-LDP) and Reservation Protocol Traffic Engineering (RSVP-TE).

Sequence B of method 300 consists of steps 305, 306A, 306B, 307, 308 and 309. At Step 305, the client or the client group, for example 104, issues data. In this implementation, the assumption that the client is a iSCSI initiator is again valid. Traditionally iSCSIs use a SCSI protocol to transfer command messages over IP networks. Therefore, iSCSi clients customarily request block data transfers. The data is transmitted to the storage device 102 via LSRs. In steps 306A to 306B, data is transmitted from the final or ultimate designated LSRn to the penultimate designated LSRn−1 and subsequently to each LSR, until it arrives at LSR1. From the LSR1, the data is transmitted to the storage disk. The data is written in the storage device at Step 307. The storage device generates and returns a signal indicating that the data was successfully received at Step 308. The client or client group that transmitted the data receives the signal at Step 309, that the data was successfully received by the storage device 102.

Sequence C of method 300 consists of steps 310, 311A, 3111B, 312A, 312B to 312n. The storage service management 101 sends a LSP release request (Step 310) to be transmitted to the final or ultimate designated LSRn. LSRn releases the LSP at Step 312. The request transfer is forwarded step by step in reverse order, until it arrives at LSR1. Each LSR that receives the request releases the LSP at Steps 312B to 312n. Ultimately, LSR1 transfers the request to the storage device and the storage device releases the LSP at Step 312A. The label switching table is thus released by the network.

As with the method 200, the data transfer has a guaranteed quality. The data is provided according to how it was defined by the label switch table, such that the QoS parameter for the data provided through the managed network is guaranteed for the clients and for the service provides.

The Label Distribution Method 300 is performed with the contribution of each individual element of the managed storage network apparatus 100. The plurality of storage service management elements 101 performs Step 301 by issuing a network path information with quality parameters. Element 101 also performs Step 310 by sending a LSP release request to the final or ultimate designated LSRn.

The storage device 102 performs a plurality of the method steps. A summary of the steps that are performed by the storage device 102 is provided below:
Step 303A when returning a table;
Step 304A when establishing an LSP for the storage device;
Step 307 when writing data into the disk storage;
Step 308 when returning an acknowledgement signal to the client that the storage device has successfully received the data; and
Step 312A when releasing the LSP.

LSR1 also performs a plurality of method steps. A summary of the steps that are performed by LSR1 is as follows:
Step 302B when transferring a path setup request to the storage device;
Step 303B when returning a label;
Step 304B when establishing a LSP;
Step 306B when transferring data via LSP;
Step 311B when transferring a LSP release request; and
Step 312B when releasing the LSP.

LSRn in the MPSL network 103 performs the following method steps:
Step 302A when sending a path setup request to LSRn−1;
Step 304C when establishing a LSP;
Step 306A when transferring data via LSP;
Step 311A when transferring the request; and
Step 312n when releasing the LSP.

The plurality of clients performs the following steps:

Step 305 when transferring the data request; and

Step 309 when receiving a confirmation signal that the data was successfully received by the storage device.

FIG. 4 illustrates an example of a data structure for the storage service level agreement definition table. The table stored by element 101.4 consists of data that sorted or classified according to the following parameters: client's address 402, service class 404, disk storage resource (LDEV) ID 406, port 408, label switching port ID 410, and direction 412. The service class parameter 404 is defined depending on the available bandwidth 414.

The information contained by table 101.4 is predefined and inputted by external operators that use the SLA management console 101.2. The parameters comprised by table 101.4 are defined as follows:

Parameter 402, Client Address, is a domain address that is assigned to each client or client group. This is the address the client uses for accessing the storage resource. As shown in the embodiment illustrated in FIG. 4, the client address parameter is able to represent the IP subnet address. The IP subnet address consists of 32 bits of a network IP address with subnet mask bit numbers.

Parameter 404, service class, refers to a service profile. Each profile is defined according to the network's quality, and more precisely either according to the bandwidth of the storage device ports or on the network LSP path performance. Examples of service classes, such as bronze, silver, gold and their corresponding bandwidth values are shown in the table 414 of FIG. 4. Each service class is assigned a priority depending on its bandwidth. As an example, the service class gold is assigned the first priority, the service class silver is assigned the second priority and the service class bronze is assigned the third priority, as shown in table 416.

As shown above in connection with FIG. 1, the performance of the storage ports of storage device 102 is managed through a storage path management element 102.2, and separately from the performance of network paths. As a result, the capability for the system described above to match the performance of the network path with the one of the network ports is provided.

Parameter 406, disk storage resource ID (LDEV), is the storage resource ID that is provided to the client groups.

Parameter 408, port, refers to the network interface ID on the storage device. The term port refers both to a physical port and a logical port. A parameter pair consisting of LDEV IDs 406 and a port 408 together define a storage internal path.

Parameter 410, label switch table ID, represents the ID stored in the table field after the LSP has been set. After the LSP has been released, this table field is cleared. However, the information stored in other fields of table 101.4 can be kept for future use.

Parameter 412, direction, indicates the direction of the data flow and the request flow. It can be either upstream or downstream.

As an example of an entry in the table 414, for client address 10.1.2.0/24, the service provided is Silver that corresponds to a bandwidth of 1 Gb/sec; the IDs of storage disks are 000 and 001; the port used is 1; and the direction for the unidirectional LSP is down.

Figure 5:
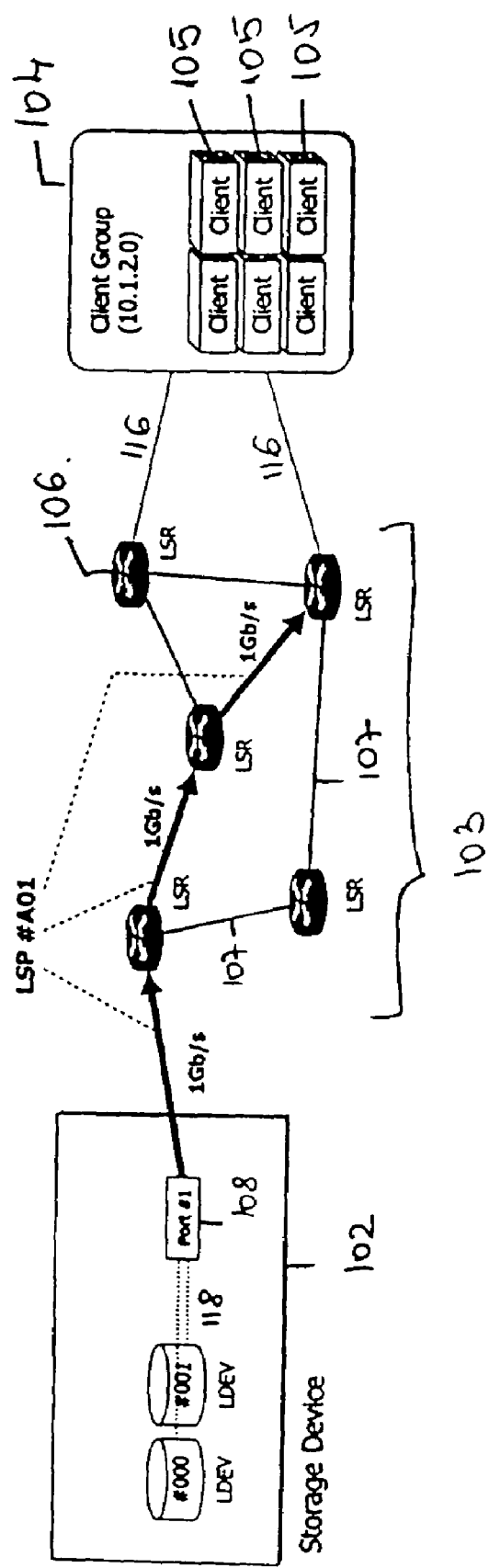
FIG. 5 illustrates an example storage network interface that has the capability to establish the label switching path.

FIG. 5 illustrates the embodiment of network 100 while providing storage services that are characterized by the above-mentioned example parameters. The storage device 102 handles the MPLS network 103 using the set A01 LSP. If the storage device is selected or designed to be capable of handling the MPLS, and the storage-network port is at least 1 Gb/sec capable, the LSP should be capable of reaching the network interface on the storage device. Based on such parameters, the quality guaranteed network path reaches the storage device.

Figure 6A:
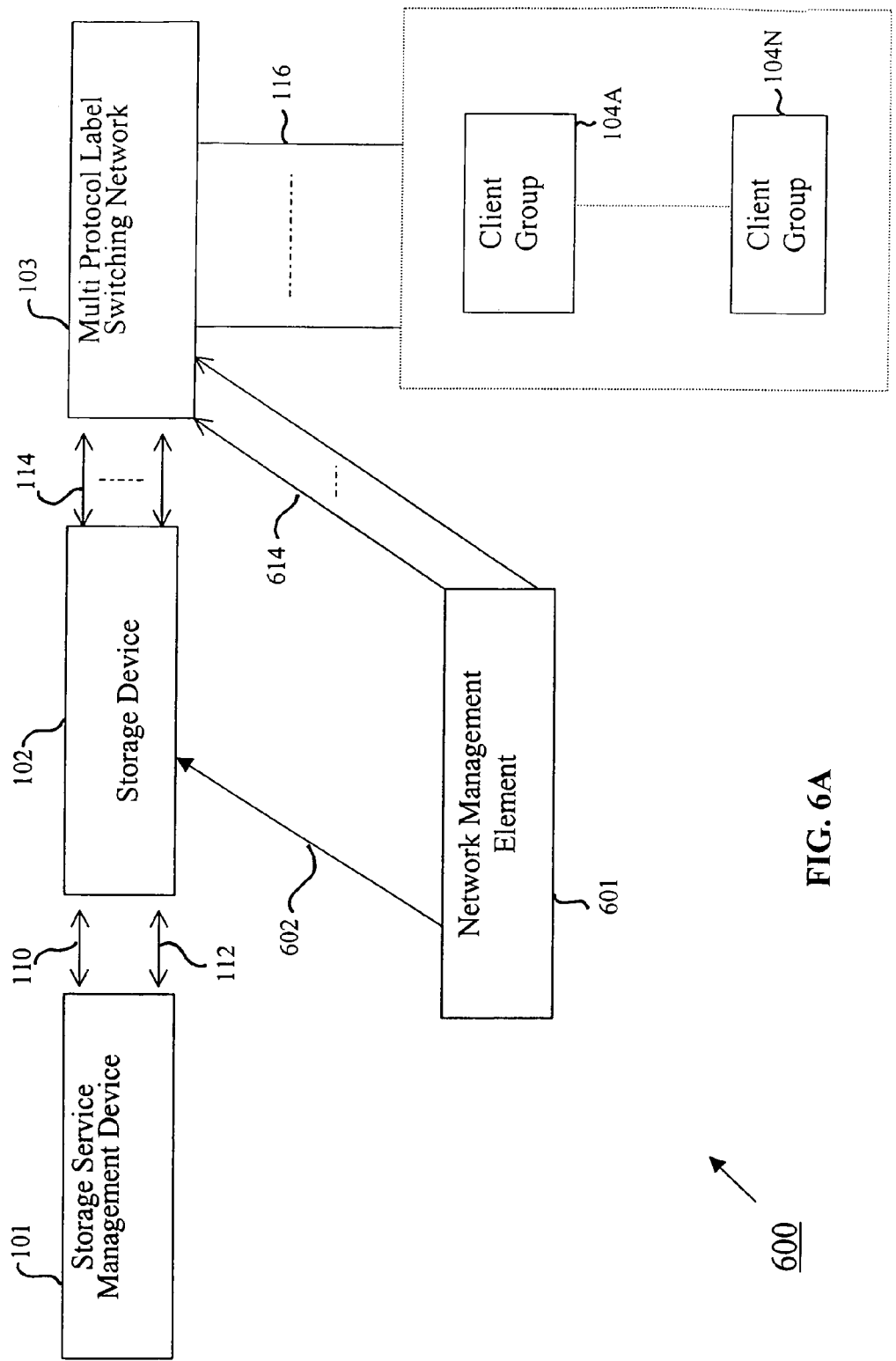
FIG. 6A is a high-level block diagram of an apparatus for storage network management with network management service.

FIG. 6A is a high-level block diagram of an apparatus for storage network management with network management service, in accordance with another aspect of the invention. The managed network storage apparatus 600 may be implemented in hardware, software and/or a combination thereof.

The managed network storage apparatus with network management service 600 includes a plurality of storage service management devices 101, a storage device 102, a multiprotocol label switching (MPLS) network 103, one or more client groups 104 and a network management device 601. The plurality of storage service management elements 101 and the storage device 102 are operatively connected in that they exchange data through a bi-directional data storage/logical device path 110 and a bi-directional data storage/port path 112. The storage device 102 and the MPLS network 103 are operatively connected by at least one port/router path 114. The MPLS network 103 and the client group section 104 are functionally connected by a plurality of information output paths 116. The network management device 601 is functionally connected to the storage device 102. The connection is realized through a bi-directional data storage/network management path 602. The network management device 601 is functionally connected to the client groups 104.

Figure 6B:
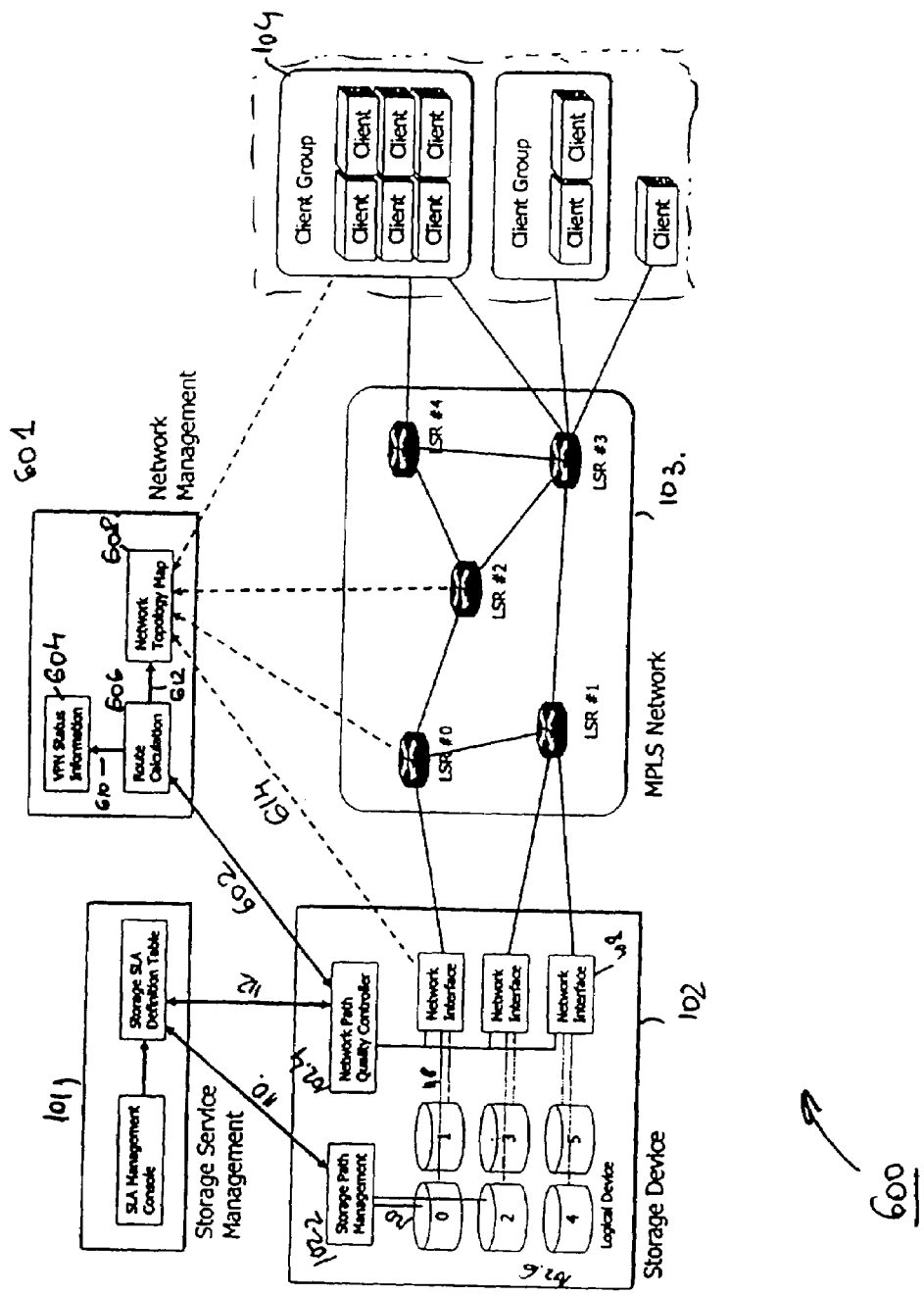
FIG. 6B illustrates an apparatus for storage network management with network management service of FIG. 6A, in accordance with an aspect of the invention.

An example implementation of the above-described apparatus 600 is shown by FIG. 6B. FIG. 6B illustrates the apparatus for storage network management with network management service of FIG. 6A, in accordance with another aspect of the present invention.

The managed network storage apparatus 600 includes a plurality of storage service management devices 101. The plurality of storage service management devices 101 may be implemented using general purpose PC hardware or other similar devices or systems as would be understood by one of skill in the art given the disclosure of the invention. An example of such PC hardware will be further described in connection with FIG. 12.

Elements 101, 102, 103, and 104 of network 600 have been previously described in connection with FIG. 1B. The description provided above for these elements applies also in connection with FIG. 6B.

In addition, the managed network storage apparatus with network management service 600 comprises a network management device 601. The network management device 601 comprises a device 604 that stores the virtual private network (VPN) status information, an apparatus 606 for generating alternative route calculation, and a storage device 608 that stores the network topology map. Apparatus 606 is connected to both device 604 and device 608 by paths 610 and 612. respectively. The apparatus 606 is directionally connected with the network path quality controller 102.4 by a data storage/network management path 602. Device 608 interacts with network interfaces 108, LSD of MPLS network 103 and the client groups 104 through router/map data management paths. All other functional and operational connections among the elements of network 600 have been previously described in connection with network 100 and apply identically to network 600.

As previously mentioned in connection with network 100, the network route of data through LSD is determined by traditional routing protocol. The quality controller element 102.4 stores a Network Path Quality Controller program.

This program controls the parameters of the network path assigned to a network interface 108. The controlled parameters include controlled bandwidth, route, etc.

The embodiment illustrated in FIG. 6B posses a network management device 601 that fulfills the function of route server. The external route server calculates routes and determines a preferable route for purposes of traffic engineering.

Figure 7A:
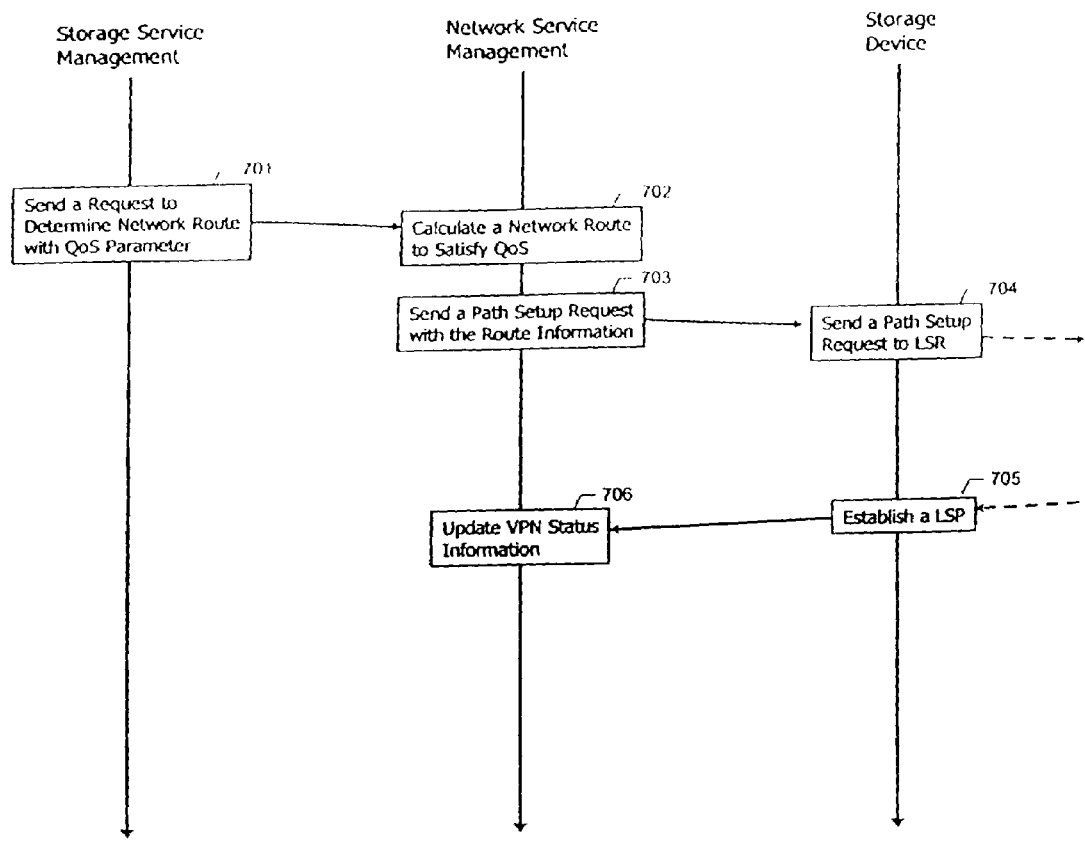
FIG. 7A illustrates a sequence of an example method flowchart for using an apparatus for storage network management, in accordance with an aspect of the invention, to set a label switching table using a network management service.

FIG. 7A illustrates a sequence of an example method flowchart for using an apparatus for storage network management with network management service in accordance with another aspect of the present invention to set a label switching table. Label distribution method 700A consists of three main sequences. Sequence A, including steps 701 to 706 as shown, establishes a label switching set. Sequence B, that transfers the data from the storage device to the client; and sequence C, that releases the label switching table, both of which are not illustrated incorporate the same steps as those used in sequences B and C of method 200, which was previously described.

According to FIG. 7A, an external operator defines a new set of storage service parameters in the storage definition table 101.4. Subsequently, at least one of the plurality of storage service management devices 101 sends requests to the network service management device 601. This is done with the purpose of determining a static route LSP. The storage service management devices send a request that contains information about the network port (source), the client (destination), and quality (bandwidth). Sending the request to determine the network route with QoS parameters constitutes Step 701 of method 700A.

The route calculation program stored by the network management device 601, in device 606, calculates the route from the network port (source) to the client (destination). The calculated route satisfies the QoS (bandwidth) parameter. The route calculation algorithm depends on the network management server. Cisco's IOS Release 12.0(5)S: Multi Protocol Label Switching (MPLS) Traffic Engineering that is incorporated herein by reference, describes an example of traffic engineering that occurs in the environment referenced above. At this point, the network management device 601 must have completed the initialization of its topology mapping. This process and an example topology will be described further on in connection with FIG. 8. The calculation of a network route that satisfies the QoS parameters constitutes Step 702 of method 700A.

The network service management device 601 sends a path setup request with the calculated route information to storage device 102 at Step 703. More precisely, the path setup request is forwarded to the network path quality controller 102.4. A standard protocol is used to deliver the network policy delivery request. Specifically, a Common Open Policy Service (COPS) protocol may be used. A full description of the techniques and mechanics of using this protocol for the above-mentioned purpose can be found in memo the COPS (Common Open Policy Service) Protocol by D. Durham et al., which is incorporated herein by reference.

The storage device 102 sends a path setup request to the LSRs at Step 704. The LSRs receive the request and each LSR establishes an LSP. The storage device also establishes a LSP at Step 705. The established LSP is forwarded from the storage device to the network service management device 601. The network service management device updates the VPN status information stored by device 604 at Step 706.

Figure 7B:
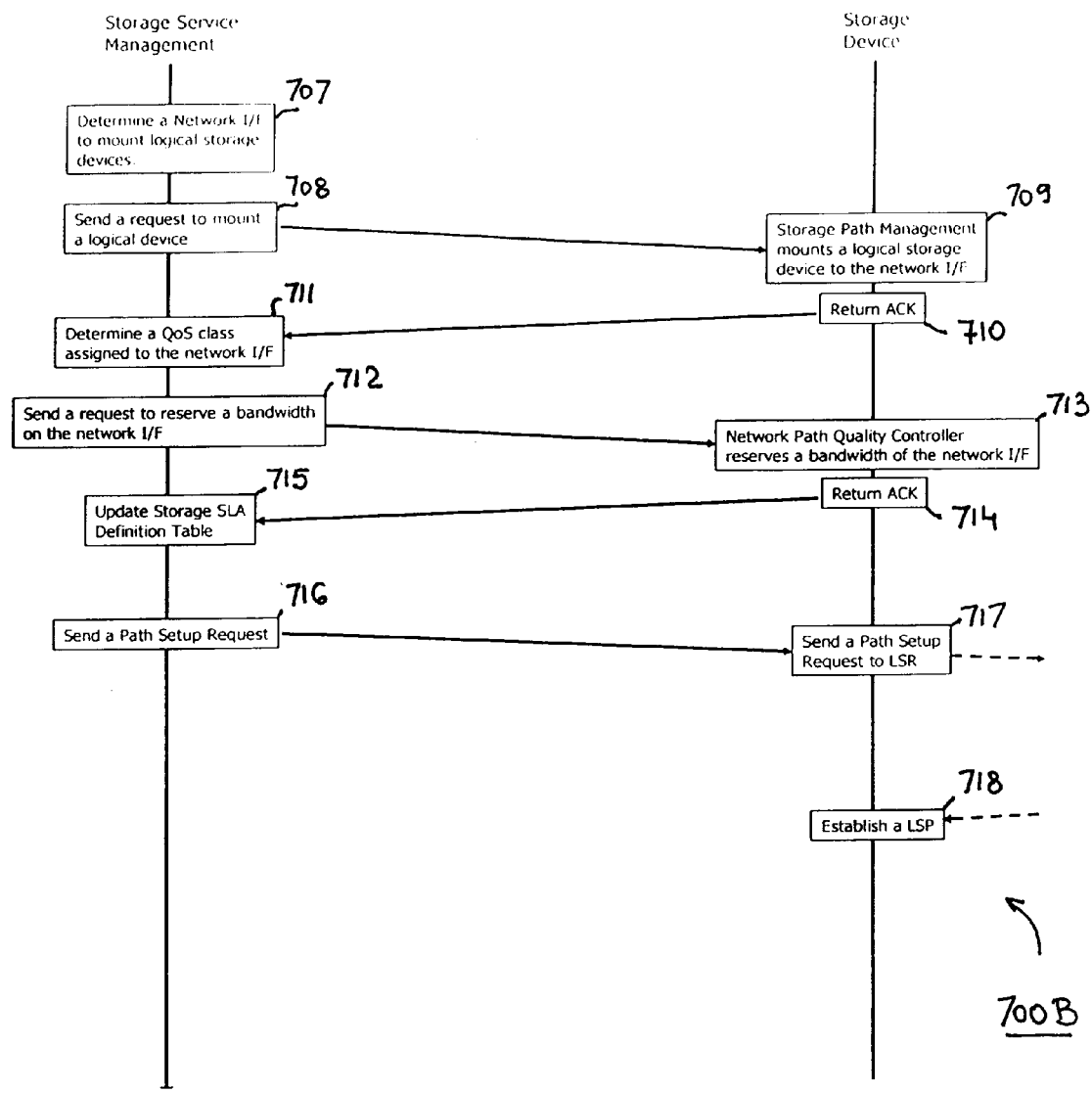
FIGS. 7B and 7C illustrate another sequence for the example method flowchart for using an apparatus for storage network management, in accordance with another aspect of the invention, for purposes of setting a label switching table using a network management service.
Figure 7C:
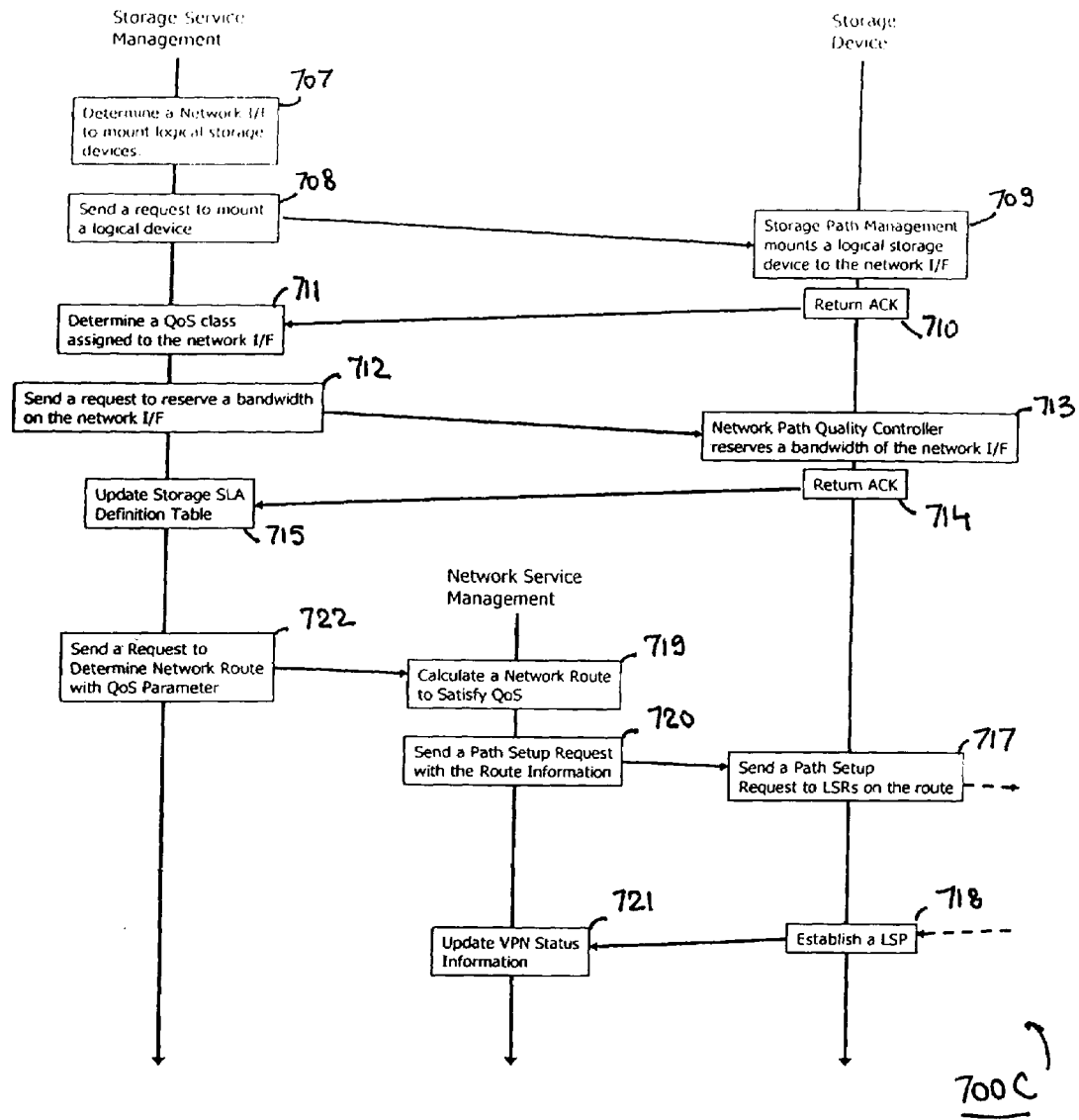

FIGS. 7B and 7C illustrate other sequences for the example method flowchart for using an apparatus for storage network management, in accordance with further aspects of the invention, to set a label switching table using a network management service.

Label distribution methods 700B and 700C each also consist of three main sequences, among which sequence A, including steps 707 to 718 or steps 707 to 722, is illustrated in FIGS. 7B and 7C, respectively. Sequence B, that transfers the data from the storage device to the client; and sequence C, that releases the label switching table, for both methods 700B and 700C, both of which are also not illustrated incorporate the same steps as those used in sequences B and C of method 200, which was previously described.

As illustrated in FIG. 7B, the storage service management device determines a network interface that is used for storage input/output by the clients. The storage service management device determines a logical storage device that is used for input/output by clients, at Step 707. Subsequently, at steps 708 and 709, the storage service management element sends a request to mount the logical device into the network interface selected at Step 707, and in actuality mounts the selected logical device into the network interface. From the storage device, an acknowledgement about the mounting of the logical device is returned to the storage service management device at Step 710. At Step 711, the storage service management device determines a QoS class that is reserved or assigned for network interface. The attributes of QoS class are defined in the SLA definition table presented in FIG. 4.

At Step 712, the storage service management device sends a request to reserve a bandwidth on the network interface. The bandwidth is specified for each QoS class selected at Step 711. As a consequence, at Step 712, a request to reserve a bandwidth on the network interface is sent to the storage device. At Step 713, the network path quality controller for the storage device reserves the bandwidth on the network interface, as requested in the previous Step 712. After the preferred bandwidth is reserved on the network interface, an acknowledgement is sent from the storage device to the storage service management device, at Step 714. After the reservation is made and the acknowledgement is received, the storage SLA definition table is updated at Step 715. The storage service management device requests the storage device to setup a LSP at Step 716. At Step 717, the path setup request is sent to the LSR. At Step 718, the LSP that is set up is connected to the network interface selected during Step 707.

Label distribution method 700C consists of Steps 707 to 715, which are identical with those steps of method 700B. In addition, method 700C further incorporates Steps 716 to 722 in connection with the operation of a network service management device. Specifically, after the reservation is made and the acknowledgement is received, the storage SLA definition table is updated at Step 715, a request to determine the network route with QoS parameters is set by the storage service management device to the network service management device at Step 722. The network service management device calculates a network route to setup the LSP while satisfying the QoS requirements at Step 719. The network service management device sends a request to the storage device at Step 720 for setting up an LSP while providing route information. This request contains route information that helps in electing between the LSRs on the LSP. The storage device sends at Step 717 a path setup request. This request contains a list of LSRs that are used and available to establish a LSP. This request message is transferred from LSR to LSR, as prescribed in the request. As a result, the LSP is calculated by the network service management device. An LSP path is then established at Step 718. The storage device sends the information about the established LSP to the network service management where the VPN status information is updated at Step 721.

FIG. 8 illustrates an example of data structure for the topology map stored by device 608. The data structure is composed of the link ID 802, the object ID 804, the port ID 806, the object ID 808, and the port ID 810. The network manager device 601 can thereby identify and locate network devices and their connection status using a traditional simple network management protocol (SNMP). An example of traditional SNMP can be found in memo IP Node Network Manager which is incorporated herein by reference.

Figure 10:
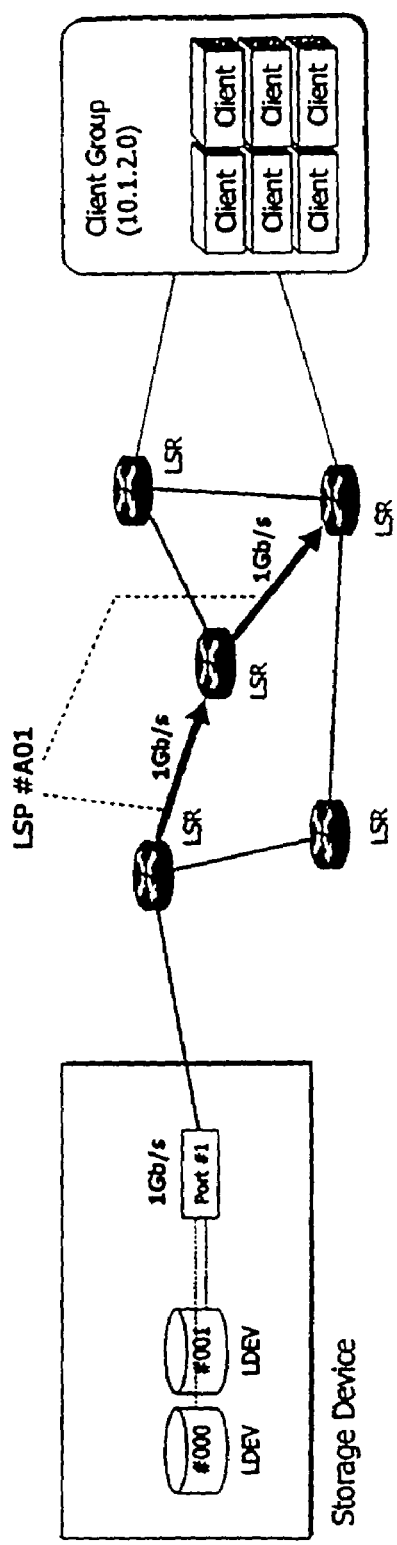
FIG. 10 illustrates an example of network that provides storage service without the capability to establish a Label Switching Path.

The actual topology of the network defined in FIG. 8 by the network topology map 608 is presented in FIG. 10. Object 6 is linked to object 0 through link 0001 through port 1. The same rational applies to the rest of the information contained in network topology map 608.

FIG. 9 illustrates an example of VPN status information stored by device 604 for network management device 601. The virtual private network status information data structure consists of LSP ID 902, LSR ID 904, link ID 906, label 908, and quality 910. An example of a network that provides the services defined by the VPN status information table is illustrated by FIG. 11.

Figure 11:
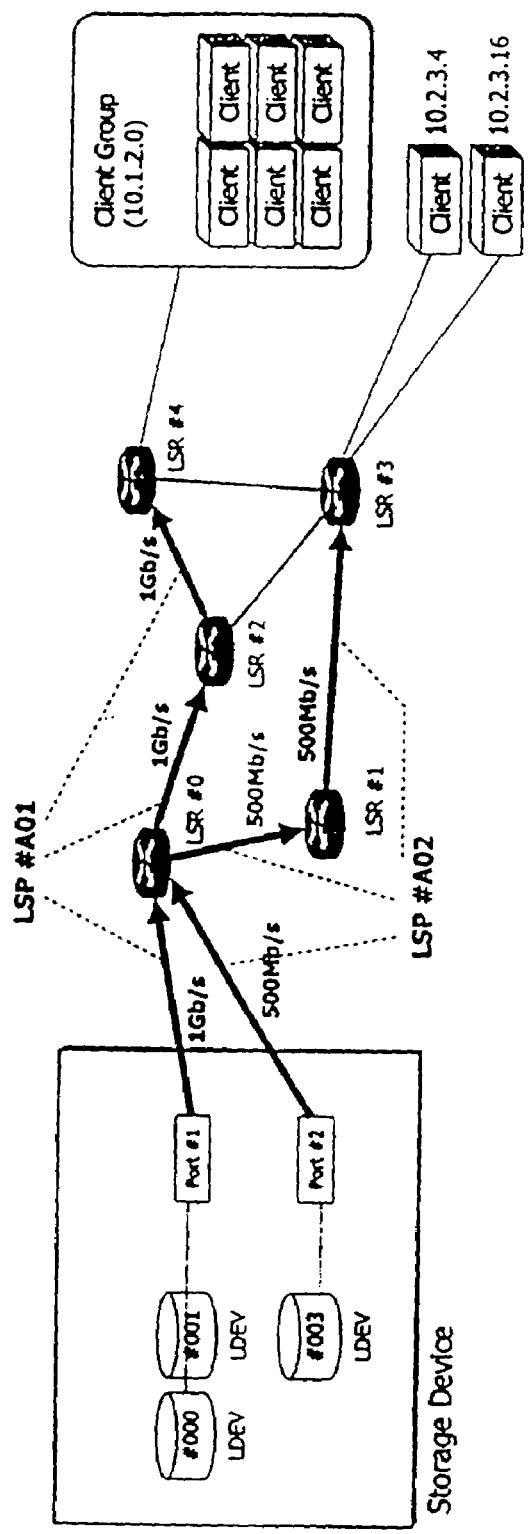
FIG. 11 illustrates an example of network that provides storage service with the capability to establish a Label Switching Path.

According to FIG. 11, the client group with address 10.1.2.0 will be delivered information with respect to the QoS parameters from storage devices LDEV 000 and 001 through port 1, with the best route defined by the LSP A01, with a bandwidth of 1 Gb/sec. In an analogous manner, the client group with addressees 10.2.3.4 and 10.2.3.16 receives information stored in LDEV 003 through port 2, with parameters defined by LSP A02, with a bandwidth of 500 Mb/sec.

Where the storage network interface does not have the capability to establish the label switching path, situation as illustrated by FIG. 10, the network manager set establishes a LSP. In this case, it is the storage service manager that controls port performance, according to how it was predefined in table 101.4. This example of storage and network integration achieves and maintains consistency in service quality.

Figure 12:
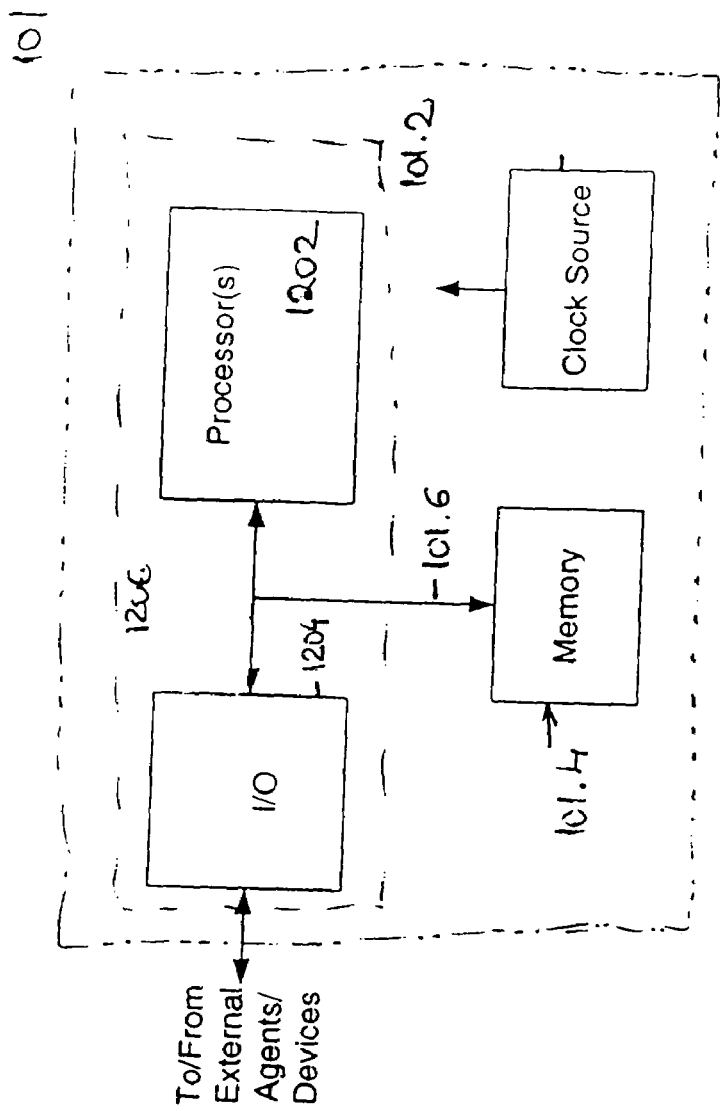
FIG. 12 illustrates an example computer system in which the storage service management block can be implemented, in accordance with an aspect of the present invention.

FIG. 12 illustrates an example of a processing system/environment for the storage service management device 101, in which the present invention can be implemented. The processing system includes a processor 1202 (or multiple processors 1202), a memory 101.4, an input/output (I/O), interface (I/F) 1204, and a communication I/F 1206 coupled between the processor, memory and I/O I/F. The processing system may also include interfaces for interfacing with external memory, external communication channels, external clocks and timers, external devices, and so on.

Memory 101.4 includes a data memory for storing information/data and program memory for storing program instructions. In the case of the preferred embodiments illustrated generically in FIGS. 1 and 6 and in detail in FIGS. 6A and 6B, element 101.4 is a simple data depository. Processor 1202 performs processing functions in accordance with the program instructions stored in memory 101.4. Processor 1202 may access data in memory 101.4 as needed. Additionally, or alternatively, processor 1202 may include fixed/programmed hardware portions, to perform some or all of the above-mentioned processing functions without having to access program instructions in memory 101.4.

Figure 13:
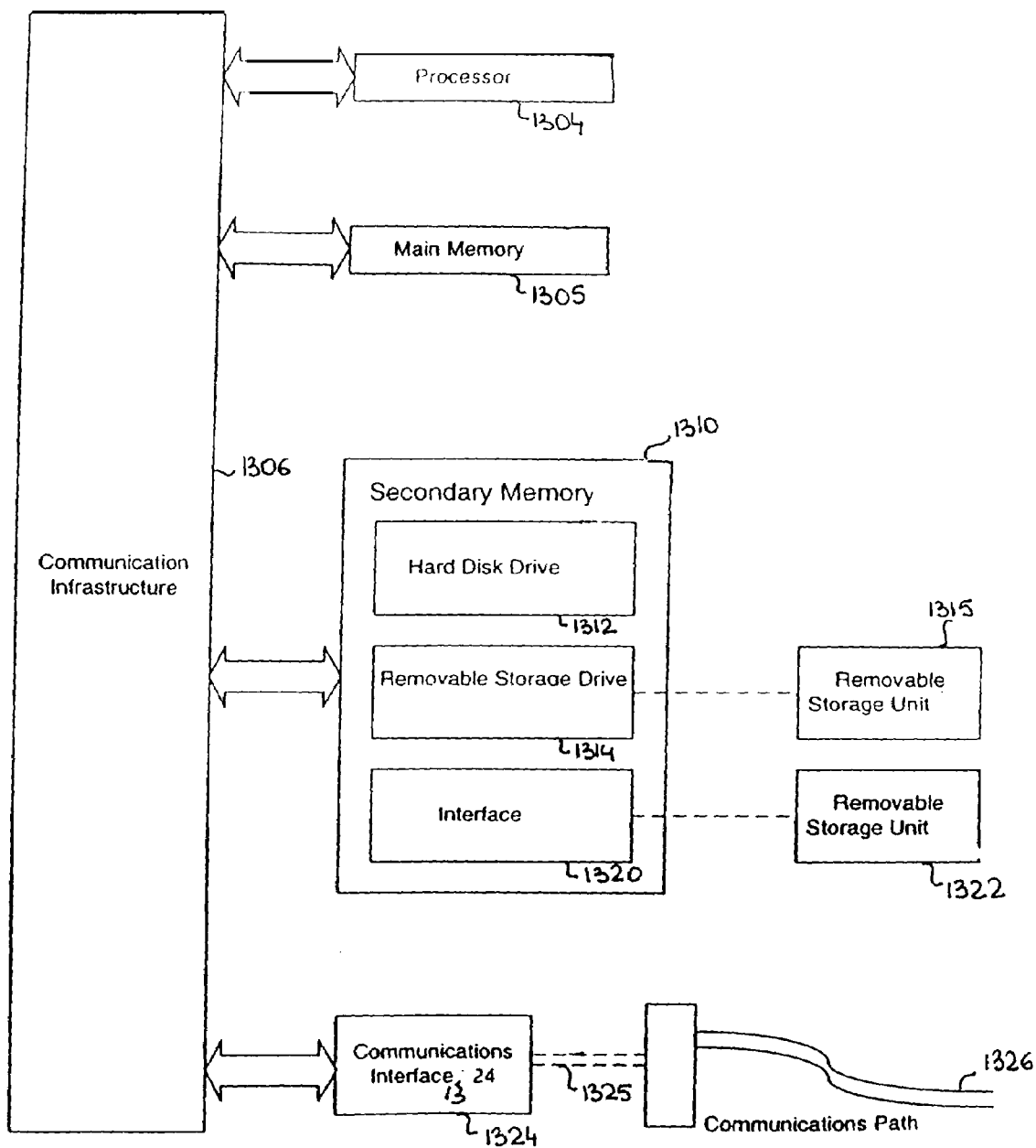
FIG. 13 illustrates an implementation in computer readable code for the present invention.

The present invention can also be implemented in computer-readable code, or software, that executes on a computer system. More precisely, all elements of the above described apparatuses that store computer readable/executable protocols may be implemented in computer-readable code, that execute on a computer system such as that shown by FIG. 13. FIG. 13 illustrates an example computer system 1300, in which the present invention may be implemented as computer-readable code. Various embodiments of the invention are described in terms of this example computer system 1300. After reading this description, it will become apparent to a person skilled in the relevant art how to implement the invention using other computer systems and/or computer architectures.

For example, in the present invention, all the protocol storing blocks of the storage device can execute on one or more distinct computer systems 1300, to implement the various methods of the present invention (for example, method 200). The computer system 1300 includes one or more processors, such as processor 1304. Processor 1304 may be a special purpose or a general purpose digital signal processor. The processor 1304 is connected to a communication infrastructure 1306 (for example, a bus or a network). Various software implementations are described in terms of this exemplary computer system. After reading this description, it will become apparent to a person skilled in the relevant art how to implement the invention using other computer systems and/or computer architectures.

Computer system 1300 also includes a main memory 1305, preferably random access memory (RAM), and may also include a secondary memory 1310. The secondary memory 1310 may include, for example, a hard disk drive 1312 and/or a removable storage drive 1314 representing a floppy drive, a magnetic drive, an optical disk drive, etc. The removable storage drive 1314 reads from and/or writes to a removable storage unit 1315 in a well known manner. Removable storage unit 1315, represents a floppy disk, magnetic tape, optical disk, etc. which is read by and written to by any removable storage drive 1314. As will be appreciated, the removable storage unit 1315 includes a computer usable storage medium having stored therein computer software and/or data.

In alternative implementations, secondary memory 1310 may include other similar means for allowing computer programs or other instructions to be loaded into compute system 1300. Such means may include a program cartridge and cartridge interface, a removable memory chip (such as EPROM, or PROM) and associated socket, and other removable storage units 1322 and interfaces 1320 which allow software and data to be transferred from the removable storage unit 1322 to the computer system 1300.

Computer system 1300 may also include a communication interface 1324. Communication interface 1324 allows software and data to be transferred between computer system 1300 and external devices. Examples of communications interface 1324 may include a modem, a network interface communications interface (such as an Ethernet card), a communications port, a PCMCIA slot and card, etc. Software and data transferred via communications interface 1324 are in the form of signals 1325 which may be electronic, electromagnetic, optical and other form of signals capable of being received by communications interface 1324 via a communications path 1326. Communications path 1326 carries signals 1325 and may be implemented using wire or cable, fiber optics, a phone line, a cellular phone link, an RF link and other communications channels.

In this document, the terms computer program medium and computer usable medium are used to generally refer to media such as removable storage drive 1314, a hard disk installed in hard disk drive 1312, and signals 1325. These computer program products are means for providing software to computer system 1300.

Computer programs (also called computer control logic) are stored in main memory 1305 and/or secondary memory 1310. Computer programs may also be received via communications interface 1324. Such computer programs, when executed, enable the computer system 1300 to implement the present invention as discussed herein. In particular, the computer programs, when executed, enable the processor 1304 to implement the processes of the present invention, such as the method(s) implemented using the structure 100 described above, such as method 200, for example. Accordingly, such computer programs represent controllers of the computer system 1300. By way of example, in the embodiments of the invention, the processes performed by SLA Management console 101.2 and Storage SLA Definition Table 101.4 may be performed by computer control logic. Where the invention is implemented using software, the software may be stored in a computer program product and loaded into computer system 1300 using removable storage drive 1314, hard drive 1312 or communications interface 1324.

CONCLUSION

While various embodiments of the present invention have been described above, it should be understood that they have been presented by way of example, and not limitation. It will be apparent to persons skilled in the relevant art that various changes in form and detail can be made therein without departing from the spirit and scope of the invention.

The present invention has been described above with the aid of functional blocks and relationship thereof. The boundaries of these functional building blocks and method steps have been arbitrarily defined herein for the convenience of the description. Alternate boundaries can be defined so long as the specified functions and relationships thereof are appropriately performed. Any such alternate boundaries ate thus within the scope and spirit of the claimed invention. One skilled in the art will recognize that these functional blocks can be implemented by discrete components, application specific integrated circuits, processors executing appropriate software and the like or any combination thereof, as was described above in connection with FIGS. 12 and 13, for example. Thus, the breath and scope of the present invention should not be limited by any of the above-described exemplary embodiments, but should be defined only in accordance with the following claims and their equivalents.

What is claimed is:

1. In a storage system having a plurality of interface ports and a plurality of logical devices, wherein the interface ports are connected to a multiple protocol label switching (MPLS) network and the interface ports are formed to conduct MPLS protocol, a method of establishing a path between a logical device and a client connected to the MPLS network, comprising:

selecting an interface port having a requested bandwidth by a client from among the plurality of interface ports;
   mounting to the selected interface port a logical device capable of handling the MPLS network and designated for the client;
   establishing a label switching path from the selected interface port over the MPLS network to the client, said label switching path having the requested bandwidth;
   setting a service priority of the selected interface port to the client in response to the requested bandwidth;
   operatively connecting the selected interface port and the client to said label switching path;
   transmitting data through said label switching path while masking data transmitted therethrough from unauthorized access by at least one of: (i) a host software, (ii) host bus adapter utilities, (iii) switch zoning, and (iv) mapping within a storage controller;
   releasing said label switching path and said logical device from the selected interface port after transmitting said data; and
   separately managing data transmission performance inside the storage system from data transmission performance of the MPLS network.

2. The method of claim 1, wherein said step of selecting the interface port from among the plurality of interface ports includes selecting the interface port based on a bandwidth characteristic of the interface port.

3. The method of claim 2, wherein said step of establishing a label switching path between the selected interface port and the client having a requested bandwidth includes establishing the label switch path based on performance characteristics of the label switch path and matching the bandwidth characteristic of the selected interface port with the performance characteristic of the label switch path.

4. The method of claim 1, wherein said step of establishing a label switching path between the selected interface port and the client having a requested bandwidth includes establishing the label switch path based on performance characteristics of the label switch path.

5. In a storage system having a plurality of interface ports and a plurality of logical devices, wherein the interface ports are connected to a multiple protocol label switching (MPLS) network and the interface ports are formed to conduct MPLS protocol, a method of establishing a path between a logical device and a client connected to the MPLS network, comprising:

selecting an interface port having a requested bandwidth by a client from among the plurality of interface ports;
   mounting to the selected interface port a logical device capable of handling the MPLS network and designated for the client;
   requesting a management server connected to the MPLS network to establish a label switching path from the selected interface port over the MPLS network to the client, said label switching path having the requested bandwidth;
   establishing the label switching path in response to said requesting step;
   setting a service priority of the selected interface port to the client in response to the requested bandwidth;
   operatively connecting the selected interface port and the client to said label switching path;
   transmitting data through said label switching path while masking data transmitted therethrough from unauthorized access by at least one of: (i) a host software, (ii) host bus adapter utilities, (iii) switch zoning, and (iv) mapping within a storage controller:
   releasing said label switching path and said logical device from the selected interface port after transmitting said data; and
   separately managing data transmission performance inside the storage system from data transmission performance of the MPLS network.

6. The method of claim 5, wherein said step of selecting the interface port from among the plurality of interface ports includes selecting the interface port based on a bandwidth characteristic of the interface port.

7. The method of claim 6, wherein said step of requesting a management server connected to the MPLS network to establish a label switching path between the selected interface port and a client having a requested bandwidth includes determining performance characteristic of the label switch path to be established and matching the bandwidth characteristic of the selected interface port with the performance characteristic of the label switch path.

8. The method of claim 5, wherein said step of establishing a label switching path between the selected interface port and the client having a requested bandwidth includes establishing the label switch path based on performance characteristics of the label switch path.

9. A storage system, comprising:

a plurality of interface ports coupled to a multiple protocol label switching (MPLS) network, each of the interface ports being formed to establish a label switching path (LSP) to a client coupled to the MPLS network;

a plurality of logical devices formed to be operatively attachable to at least one of the plurality of interface ports;

means for selecting an interface port having a requested bandwidth by a client from among the plurality of interface ports;

means for mounting to the selected interface port a logical device capable of handling the MPLS network and designated for the client;

means for establishing a label switching path from the selected interface port over the MPLS network to the client, said label switching path having the requested bandwidth;

means for setting a priority of service to the client with which the label switching path is established in response to the requested bandwidth;

means for operatively connecting the selected interface port and the client to said label switching path;

means for transmitting data through said label switching path while masking data transmitted therethrough from unauthorized access by at least one of: (i) a host software, (ii) host bus adapter utilities, (iii) switch zoning, and (iv) mapping within a storage controller;

means for releasing said label switching path and said logical device from the selected interface port after transmitting said data; and means for separately managing data transmission performance inside the storage system from data transmission performance of the MPLS network.

10. A storage system, comprising:

a plurality of interface ports coupled to a multiple protocol label switching (MPLS) network, each of the interface ports being formed to establish a label switching path (LSP) to a client coupled to the MPLS network;

a plurality of logical devices formed to be operatively attachable to at least one of the plurality of interface ports;

a management server operatively connected to the MPLS network, the management server including:

means for selecting an interface port having a requested bandwidth by a client from among the plurality of interface ports;

means for controlling a logical device capable of handling the MPLS network and designated for the client to be mounted to the selected interface port;

means for establishing a label switching path from the selected interface port over the MPLS network to the client, said label switching path having the requested bandwidth;

means for setting a priority of service to the client with which the label switching path is established in response to the requested bandwidth;

means for controlling the selected interface port and the client to be operatively connected to said label switching path;

means for controlling data to be transmitted through said label switching path while masked from unauthorized access by at least one of: (i) a host software, (ii) host bus adapter utilities, (iii) switch zoning, and (iv) mapping within a storage controller;

means for releasing said label switching path and said logical device from the selected interface port after said data is transmitted; and means for separately managing data transmission performance inside the storage system from data transmission performance of the MPLS network.

* * * * *